Patented Aug. 16, 1927.

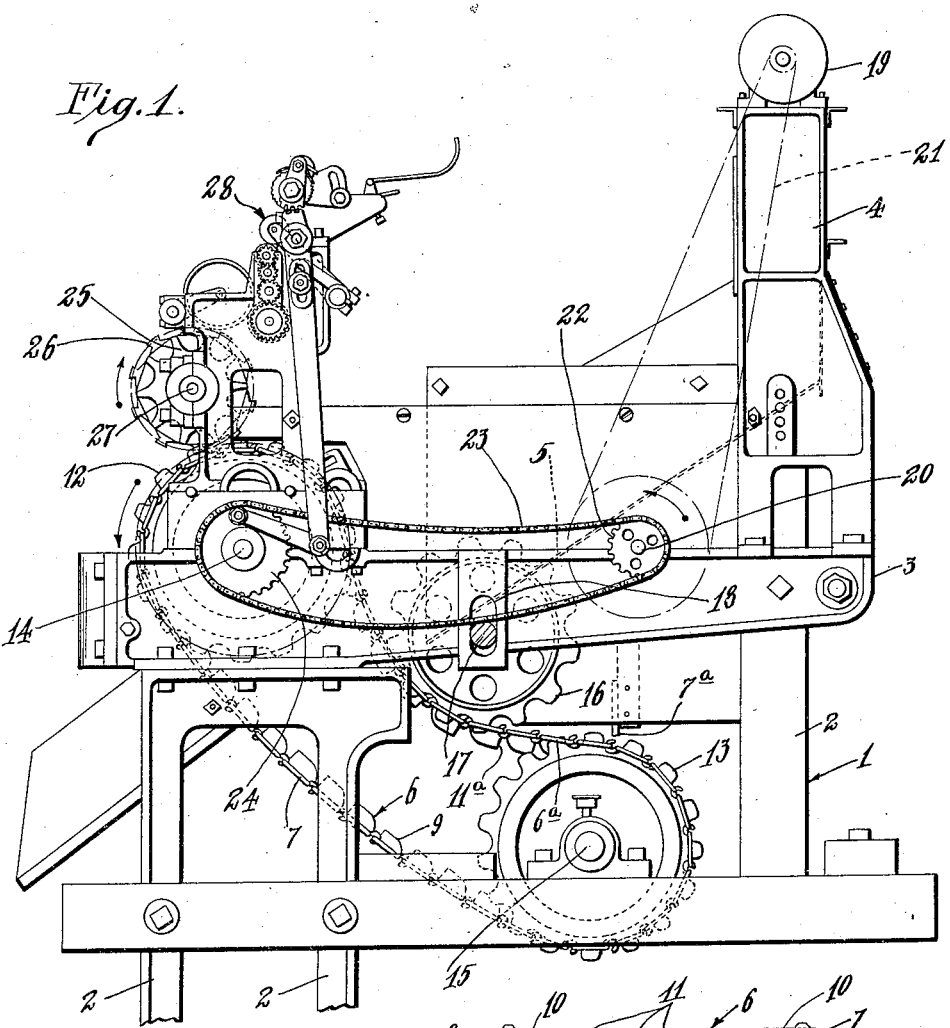

1,639,291

UNITED STATES PATENT OFFICE.

FRANK HAYES, OF EL MONTE, CALIFORNIA, ASSIGNOR TO CALIFORNIA WALNUT GROWERS ASSOCIATION, OF LOS ANGELES, CALIFORNIA, A CORPORATION OF CALIFORNIA.

BRANDING MACHINE.

Application filed January 27, 1926. Serial No. 84,032.

This invention relates to branding machines and more particularly to branding machines for branding or marking irregular surfaced articles and articles of irregular surface contour and size, such as walnuts or the like.

Many attempts have heretofore been made to brand, stamp or imprint upon the surfaces of walnuts and other like and similar articles of irregular surface or irregular contour and of irregular size, which attempts have been for the most part impractical, non-operative and expensive, so that there cannot be said to be a completely successful apparatus for continuously branding walnuts and the like.

The principal difficulty encountered in branding or marking walnuts is a resultant of the irregular surface and irregular surface contour, size and shape of such articles, such as walnuts, which results in the arching of the walnuts on the delivery cloth so that the same cannot be fed uniformly into a marking machine but will arch and will entirely clutter up the machine so that the same soon becomes inoperative without continuous and close attention to prevent such arching.

It is therefore an object of this invention to provide an apparatus in which the walnuts may be taken from an inclined trough and delivered by means of a continuous conveyor in single file relation past a printing or marking mechanism so that arching will be prevented and a continuous stream of walnuts will be fed to the printing or marking means.

Another object of this invention is to provide a conveyor for taking walnuts from an inclined chute continuously and delivering the same to the marking means, which conveyor is of the endless type and is mounted at such an incline that the walnuts will be segregated from the mass one line at a time and conveyed.

Other objects and advantages of this invention will be apparent from the following detailed description of a preferred embodiment thereof as illustrated in the accompanying drawings, in which drawings:

Figure 1 is a side elevation of a walnut branding machine embodying this invention.

Figure 2 is a fragmental top plan view of a conveyor embodying this invention.

Figure 3 is an end section of the conveyor taken substantially on the line 3—3 of Figure 2.

In the preferred embodiment of this invention, illustrated in the accompanying drawings, 1 illustrates a standard or frame having uprights 2 to which the frame 3 of the apparatus is secured. Mounted at one end of the frame 3 is a chute 4 into which the walnuts or other like or similar articles to be branded or marked are introduced. An inclined chute 5 leads from the vertically extending chute 4 to a point of delivery of the articles to be stamped adjacent a conveyor 6.

The conveyor 6 is of the endless type and is composed of a pair of endless side chains 7 and 8 to which blocks 9 are secured as at 10. The blocks 9 are preferably constructed of cast aluminum and have a plurality of cups 11 formed therein, which cups 11 are preferably of the shape of a segment of a sphere and have a flat rear wall 11ª.

The chains 7 and 8 are trained over sprockets 12 at the opposite sides of the apparatus, (only one of which sprockets 12 is shown in the drawing), and over sprockets 13 mounted below the sprockets 12 (likewise only one of the sprockets 13 is shown in the drawing). The sprockets 12 are keyed to a shaft 14 which is disposed in bearings transversely of the frame 3. The sprockets 13 are keyed to a shaft 15 which is journaled in bearings transversely of the frame or standard 1.

The sprockets 12 and 13 are so mounted that the conveyor 6 is in an inclined position at an angle from the horizontal greater than 45°. A pair of idler sprockets 16 are mounted at pins 17 journaled in bearing members on the frame 3. The pins 17 are adjustably supported in slots 18 so that the angle of inclination of the conveyor 6, as well as the tension in the chains 7 and 8, may be regulated by adjusting the position of the pin 17 in the slot 18. In order to drive the conveyor 6, a motor 19 is provided which drives a countershaft 20 through a belt connection 21. A sprocket 22 is keyed to the shaft 20 and a chain 23 is chained over the sprocket 22 and over a sprocket 24 keyed to the shaft 14.

A printing roller 25 having stamps 26 secured around its periphery in position adjacent the cups 11 is mounted on a shaft 27 journaled in bearings transversely of the frame and which printing roller is adjacent and slightly in advance of the highest point of travel of the cups 11 and conveyor 6 of the sprockets 12. The printing roller 25 may be of any desired or preferred construction and is preferably of the type illustrated in the copending application of Hubert C. Sharp, filed January 27, 1926, Serial No. 84,020. Mounted on the frame 3 is an inking mechanism 28 for applying ink to the stamps 26 mounted on the roller 25, which inking mechanism may be of any desired or preferred construction as is well understood in the art.

The chute 5 terminates a distance away from the conveyor 6 so as to provide a path between the conveyor 6 and the end of the chute 5 along which the walnuts or articles to be marked may travel to the substantially flat portion 6ª of the conveyor 6 where the said articles fall into the pockets 11. The articles are retained in the pockets 11 against the rear wall thereof as the conveyor travels upward from the flat portion 6ª. The articles, such as walnuts, are traveling down the path along the conveyor and therefore insure that each pocket will contain only one article to be marked. The conveyor is inclined so that the excess walnuts will fall from the pockets when subjected to this counter current flow of the walnuts in the path.

A baffle-plate 7ª is provided to prevent the nuts from running off the conveyor 6.

Having fully described the preferred embodiment of this invention, it is to be understood that I do not wish to be limited to the exact details herein set forth which may obviously be varied without departing from the spirit of my invention as set forth in the appended claims.

I claim:

1. In an apparatus of the class described, the combination of an inclined chute, an oppositely inclined conveyor having a plurality of removable blocks, each of which blocks is provided with a plurality of independent recesses forming nut receiving cups, and a pair of side chains to which the blocks are removably secured, means for driving the conveyor, and a printing mechanism supported in position adjacent the conveyor.

2. In an apparatus of the class described, the combination of an inclined conveyor having a plurality of bars having a plurality of independent nut receiving and conveying cups formed therein, a pair of endless chains, means for removably mounting the said bars between the chains, means for driving the endless conveyor, and a printing mechanism supported in position adjacent the conveyor.

3. In an apparatus of the class described, the combination of an inclined conveyor having a plurality of bars removably mounted therein, each of which bars has a plurality of independent recesses formed therein forming nut receiving cups, the said conveyor being driven at an incline of greater than 45° from the horizontal, means for driving the conveyor, and a printing mechanism supported in position adjacent the conveyor.

4. In an apparatus of the class described, the combination of a downwardly inclined chute, an upwardly inclined conveyor inclined at an angle greater than 45° from the horizontal and having a plurality of individual open pockets formed for the receiving of articles to be stamped, means for driving the conveyor, and a printing mechanism supported in position to print upon the articles freely mounted within the individual open pockets.

5. In an apparatus of the class described, the combination of a downwardly inclined chute, a conveyor having an upwardly inclined portion and a substantially horizontal portion down which the nuts flow, and a plurality of pockets formed in the said conveyor.

6. In an apparatus of the class described, the combination of a conveyor having an upwardly inclined portion and a substantially horizontal portion, a downwardly inclined chute terminating a distance from the conveyor and down which the articles to be marked flow to the horizontal portion of the conveyor, countercurrently to the direction of travel of the said conveyor, and a plurality of pockets formed in the conveyor.

7. In an apparatus of the class described, the combination of a pair of spaced endless chains, a plurality of blocks secured to the said chains at their opposite ends to provide an inclined conveyor, the said blocks having a plurality of cups formed therein, which cups are of approximately the shape of a segment of a sphere having a flat rearward wall and means mounted adjacent the upper substantially horizontal end of the said conveyor for marking the articles freely positioned within the said cups.

8. In an apparatus of the class described, the combination of a conveyor having an upwardly inclined portion and a plurality of open nut receiving cups, a downwardly inclined chute mounted in position adjacent the intermediate and inclined portion and having its delivery end spaced from the said inclined portion of the conveyor a distance greater than the largest diameter of the said nuts, sprockets over which the said conveyor is trained at its upper end, and means mounted adjacent and above the said sprockets for marking the nuts freely positioned within the said open cups.

9. In an apparatus of the class described, the combination of an endless conveyor, sprockets over which the said endless conveyor is trained, means for driving one of the said sprockets, the said conveyor having an upwardly inclined portion and a substantially horizontal portion intermediate the said sprockets, and a downwardly inclined chute terminating a distance away from the said conveyor intermediate the said sprockets.

10. In an apparatus of the class described, the combination of a conveyor having an upwardly inclined portion and a substantially horizontal portion, a plurality of open nut receiving cups, a downwardly inclined chute mounted in position adjacent the said inclined portion and spaced therefrom a distance greater than the largest diameter of the said nuts, sprockets over which the said conveyor is trained at its upper end, means mounted adjacent and above the said sprockets for marking the nuts freely positioned in the said open cups, and a baffle mounted in position adjacent the lower end of the said horizontal portion of the said conveyor.

11. In an apparatus of the class described, the combination of a conveyor, sprockets over which the said conveyor is trained, means for driving one of said sprockets, the said conveyor having an upwardly inclined portion and a substantially horizontal portion intermediate the said sprockets, means for delivering the nuts to the said conveyor between the said sprockets, and means mounted adjacent and above the upper of said sprockets for marking the nuts conveyed by the said conveyor.

Signed at El Monte, Calif., this 19 day of January, 1926.

FRANK HAYES.